United States Patent [19]

Byrnes et al.

[11] Patent Number: 4,676,669

[45] Date of Patent: Jun. 30, 1987

[54] TAILORING TILT IN AN ELASTOMERIC HIGH TORQUE, CONSTANT VELOCITY JOINT

[75] Inventors: Francis E. Byrnes, White Plains, N.Y.; Donald L. Ferris, Newtown; Eric G. Olsen, Woodbury, both of Conn.

[73] Assignee: United Technologies Corporation, Hartford, Conn.

[21] Appl. No.: 904,792

[22] Filed: Sep. 4, 1986

Related U.S. Application Data

[63] Continuation of Ser. No. 622,591, Jun. 20, 1984, abandoned.

[51] Int. Cl.$^4$ .................. B64C 27/38; F16C 27/06; F16C 27/07
[52] U.S. Cl. .................................. 384/221; 384/124; 384/125; 384/620; 416/134 A
[58] Field of Search ............... 384/124, 125, 202, 203, 384/215, 220, 221, 222, 620

[56] References Cited

U.S. PATENT DOCUMENTS

| | | |
|---|---|---|
| 1,488,740 | 4/1924 | Dobbins . |
| 2,146,764 | 2/1939 | Ricefield .................... 464/87 |
| 2,363,469 | 11/1944 | Goldschmidt ............. 464/89 X |
| 3,504,902 | 4/1970 | Irwin ....................... 464/90 X |
| 3,524,332 | 8/1970 | Callies ....................... 464/80 |
| 4,012,923 | 3/1977 | Lundgren .................. 464/90 |
| 4,142,833 | 3/1979 | Rybicki et al. ............ 384/221 |
| 4,208,889 | 6/1980 | Peterson ................... 464/138 |
| 4,256,354 | 3/1981 | Peterson ................ 308/2 A X |
| 4,323,332 | 4/1982 | Frandenburgh ........ 416/134 A |

FOREIGN PATENT DOCUMENTS 919351 6/1959 United Kingdom .

OTHER PUBLICATIONS

Lastoflex Bearing Design Guide, Revision A, Mar. 1, 1979, Lord Corporation, Figure 8.
"The Sikorsky Elastomeric Rotor", Robert Rybicki, Annual National Forum of the American Helicoptor Society, 5/79.

Primary Examiner—Stuart S. Levy
Assistant Examiner—Lynn M. Sohacki
Attorney, Agent, or Firm—Gerald E. Linden

[57] ABSTRACT

The tiltwise stiffness of an axially-lobed, nearly-spherical elastomeric joint is made uniform at all azimuths by contouring the axial height of the elastomer or by reducing the thickness or durometer of the elastomer at azimuths where the joint otherwise would be tiltwise stiffer, such as at the lobes. The improvement is useful in the application of the joint to a gimbal-like rotor system.

2 Claims, 14 Drawing Figures

TAILORING TILT IN AN ELASTOMERIC HIGH TORQUE, CONSTANT VELOCITY JOINT

This application is a continuation of U.S. patent application Ser. No. 622,591 filed 6-20-84, now abandoned.

CROSS REFERENCE TO RELATED APPLICATIONS

Cross reference is made herein to copending, commonly-owned U.S. patent application Ser. No. 622,809 entitled ELASTOMERIC HIGH TORQUE CONSTANT VELOCITY JOINT, filed on even date herewith by Byrnes et al and U.S. patent application Ser. No. 622,801, now U.S. Pat. No. 4,575,358, entitled ELASTOMERIC HIGH TORQUE, CONSTANT VELOCITY JOINT, filed on even date herewith by Ferris.

DESCRIPTION

1. Technical Field

This invention relates to a high torque, constant velocity joint employing elastomeric bearing technology.

2. Background Art

In copending, commonly-owned U.S. patent application No. 622,809, entitled ELASTOMERIC HIGH TORQUE CONSTANT VELOCITY JOINT, and filed on even date herewith by Byrnes, et al, there is disclosed a nearly spherical elastomeric bearing having an inner shell, an outer shell, and alternate layers of elastomer and nonresilient shims interposed at increasing radii therebetween. The bearing is rotatable about a longitudinal axis and has two axial ends. Axial deviations from true sphericity give the bearing a lobed (non-circular) latitudinal (transverse) cross-section, particularly on an equatorial plane which is normal to the axis and midway between the ends. The lobes cause applied torque to be reacted by elastomer bending (tension and compression normal to each layer), rather than in shear. The tensile stresses produced by elastomer bending are reduced by bearing precompression. On the other hand, the profile of the bearing is nearly spherical so that the bearing is very compliant in tilt via elastomer shear. Both ends of the bearing are truncated (open)—one for attachment of a rotatable drive member to the inner shell, and the other for polar symmetry, which is necessary for homokineticity. A rotatable load member is attached to the outer race of the bearing so that the bearing is useful as a flexible homokinetic joint. Because of the lobes, the bearing tends to be stiffer when tilted through certain azimuths, such as at the lobes. The variations in stiffness are small, and typically will not affect the homokineticity of the joint. However, they will tend to introduce vibrations into a system using the joint. These vibrations are detrimental in certain applications of the joint.

Consider the case of a helicopter gimbal rotor system wherein a portion of rotor flapping is accommodated by tilting a rotor hub relative to a rotor shaft, rather than through individual, articulated flap hinges for each blade. As discussed previously, a Hooke joint can accommodate both high torque and tilt, but introduced cyclic pulsations in the load which, in the context of a helicopter, would be extremely undesirable, not only from a viewpoint of passenger comfort, but, more fundamentally, from a control viewpoint. Therefore, it is known to provide a rotor system with a gimbal bearing, such as a ball joint, to accommodate flapping, and separate means, such as a torque-rigid boot, to supply driving torque to the rotor. Examples of these systems are discussed in U.S. Pat. No. 4,323,332 (Fradenburgh, 1982), entitled HINGELESS HELICOPTER ROTOR WITH ELASTIC GIMBAL HUB. By contrast, the bearing of the cross-referenced Byrnes patent application No. 622,809 offers the possibility for accommodating torque and tilt (flat) in a single component, thereby reducing parts count and complexity, while providing the benefits of elastomeric bearings. The improvement disclosed herein makes that bearing much more useful in the context of a gimbal-like rotor system and in other applications.

DISCLOSURE OF INVENTION

Therefore it is an object of this invention to improve the bearing of the aforementioned Byrnes patent application No. 622,809 by providing for uniform tiltwise stiffness of the bearing at all azimuths.

According to the invention, the improvement relates to altering a characteristic of the elastomer locally so that there is less resistance to tilt at azimuths where the bearing otherwise would be stiffer. According to one technique, at least one end of the bearing is contoured so that there is less resistance to tilt locally, at azimuths where the bearing otherwise would be stiffer (less compliant) in tilt. According to an alternate technique, the elastomer is locally thinner so that there is less resistance to tilt at azimuths where the bearing otherwise would be stiffer. According to yet another technique, the durometer of the elastomer is locally softer so that there is less resistance to tilt at azimuths where the bearing otherwise would be stiffer. These techniques may be used singly or in combination with one another to achieve uniform tiltwise stiffness.

The improvement for making the tiltwise stiffness uniform makes the bearing more useful in a gimbal-like rotor head application, where the hub drives torque and accommodates a portion of flapping (tilt), than it otherwise would be without the improvement.

Another improvement, for enhancing the axial load-carrying capability of the lobed bearing so that it is better suited for application to a gimbal-like rotor system is disclosed in copending, commonly-owned U.S. patent application No. 622,801, entitled IMPROVED ELASTOMERIC HIGH TORQUE CONSTANT VELOCITY JOINT, and filed on even date herewith by D. Ferris, et al. That improvement can be used in conjunction with the improvement of the present invention.

Other objects, features, advantages, and applications of the invention will become apparent in light of the following description of the invention and the accompanying drawings.

BRIEF DESCRIPTION OF THE DRAWINGS

FIG. 4 is a transverse cross-sectional view of a model bearing segment, in unloaded (4a) and torsionally loaded (4b) states, which highlight certain principles involved in the bearing of FIGS. 1 and 2:

FIG. 6 is a transverse cross-sectional view of a model bearing segment, in unloaded (6a) and torsionally loaded (6b) states, relating to the embodiment of FIG. 5.

BEST MODE FOR CARRYING OUT THE INVENTION

Torsional Stiffness

Figure 1:
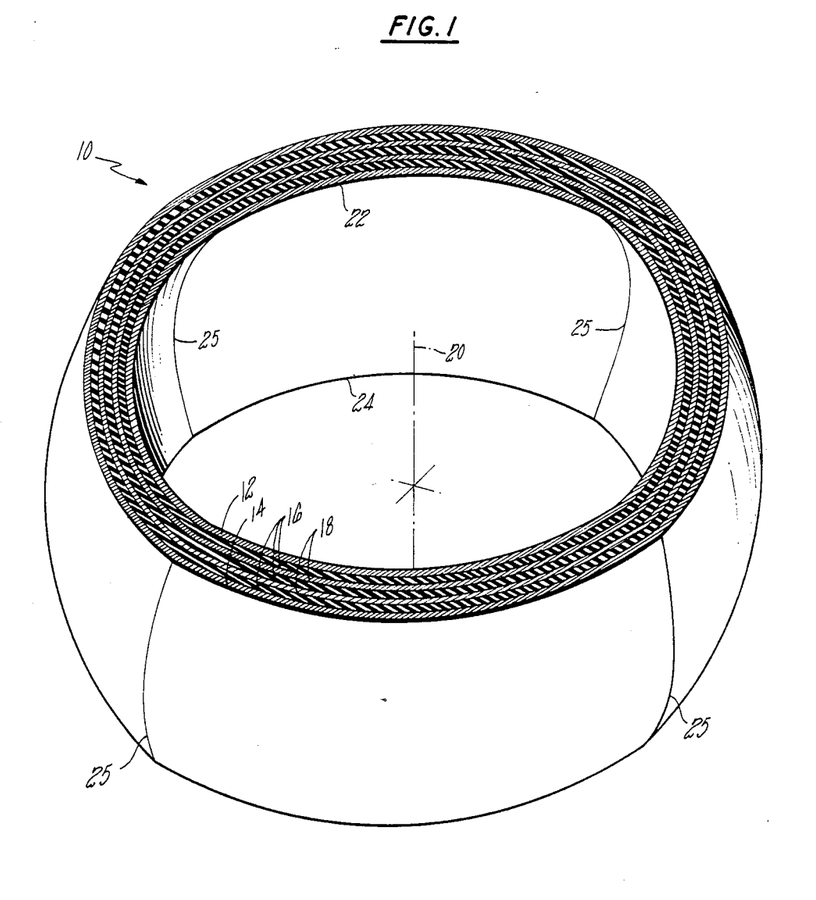
FIG. 1 is a perspective view of an embodiment of the bearing of this invention.

In FIG. 1 is shown an embodiment of the elastomeric bearing 10 of this invention comprising an inner shell 12, an outer shell 14, and alternate layers of an elastomer 16 and nonresilient shims 18 interposed therebetween at increasing radii. The number of layers is not limited to the number shown and could even be a single layer of elastomer with no shims. The overall shape of the bearing is nearly spherical, having a longitudinal axis of rotation 20. The bearing 10 is open at at least one axial end for connecting a rotatable drive or load member to the inner race 12. As shown, the bearing 10 is open at both ends for polar symmetry, thereby defining an upper edge 22 and a lower edge 24. An axial height is defined between the edges 22 and 24. The bearing 10 is not a true sphere due to longitudinal lobes or eccentricities 25 distributed about its azimuth.

As used herein, the term "azimuth" generally refers to a position about the circumference of the bearing, or an angle thereto, on a plane normal to the axis 20. However, since the bearing is not truly spherical, the use of the term "circumference" would be inapposite.

Figure 2:
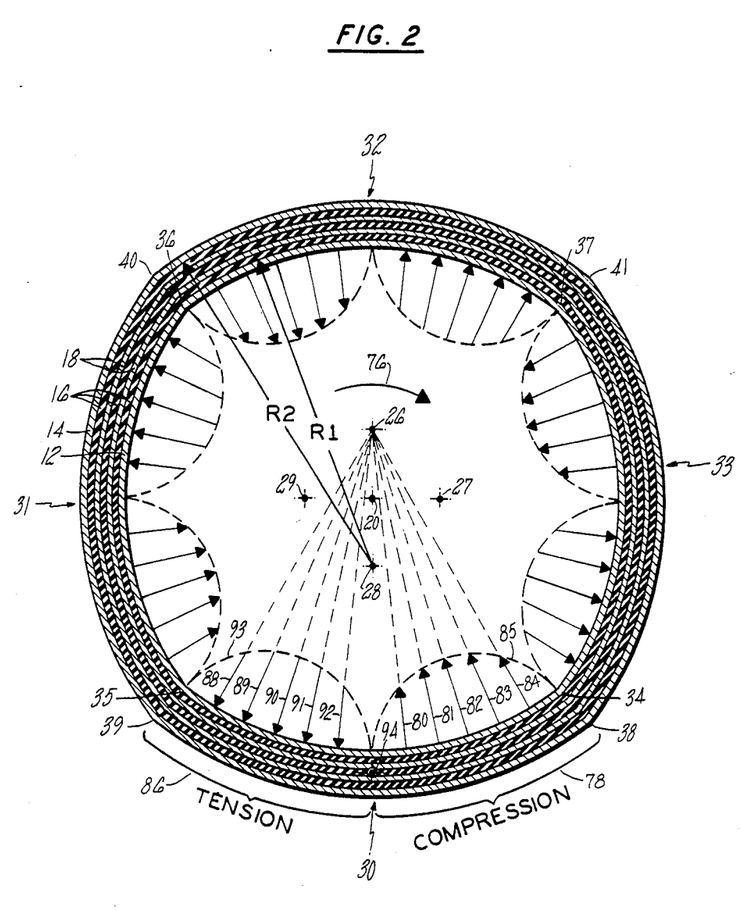
FIG. 2 is a transverse cross-sectional view of the bearing of FIG. 1 through its equatorial plane with a hydrostatic pressure pattern superimposed thereon.

The lobes 25 result from the noncircular transverse cross-section of the bearing—best viewed in FIG. 2, which is a cross-section of the bearing 10 on an equatorial plane which is normal to the axis and midway between the ends. As described hereinafter, the transverse cross-section of the elastomer layers 16 is especially important to the bearing's ability to transmit high torque loads and results essentially from the transverse contours of the exterior (elastomer-facing) surface of the inner shell 12 and the interior (elastomer-facing) surface of the outer shell 14.

The transverse contour of the interior surface of the inner shell 12 is defined by a radius (R1) from each of four arc segment generating points 26–29 which are equally offset from the axis 20 and symmetrically distributed (every ninety degrees, azimuthally) thereabout. The radius (R1) is greater than the distance from the inner shell 12 to the axis 20. Therefore, the transverse contour of the exterior surface of the inner shell 12 is four intersecting nonconcentric arc-segments 30–33, the intersections of which are four outwardly-extending lobes 34–37 which are symmetrically distributed about the azimuth of the bearing. Similarly, the transverse contour of the interior surface of the outer shell 14 is defined by a radius (R2), which is greater than the radius (R1) by the combined thicknesses, of the elastomer 16 and shims 18, from the points 26–29. Four outwardly-extending lobes 38–41 are thereby defined in register (azimuthally) with the lobes 34–37 of the inner shell 12, respectively. The transverse contours of the exterior (facing away from the elastomer 16) surface of the shell 12 and interior (facing away from the elastomer 16) surface of the shell 14 are not particularly germane to an understanding of the invention and may be adapted to couple to a drive member and a load member, in any suitable manner, such as that described hereinafter with reference to FIG. 7.

The cross-section of a particular elastomer layer or shim would be defined by an appropriate radius, having a magnitude larger than (R1) and less than (R2), from the points 26–29, and a thickness.

As mentioned hereinbefore, the torque-handling capability of the bearing derives from the transverse cross-sections of the elastomer layers 16 and is best understood by reference to two models.

Figure 3:
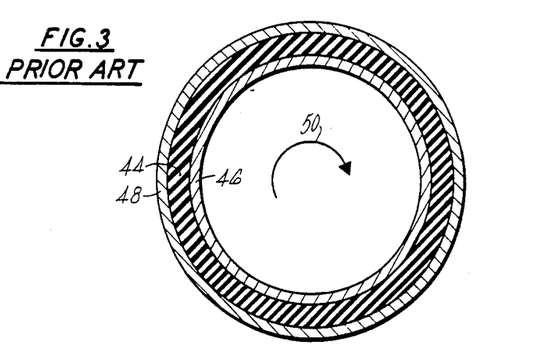
FIG. 3 is a transverse cross-sectional view of a bearing of the prior art.

The first model is a spherical or cylindrical radial bearing of the prior art, either of which has a circular transverse cross-section as shown in FIG. 3. Therein a layer 44 of elastomer is disposed between an inner shell 46 and an outer shell 48. When torque is applied to the inner shell 46 in a clockwise direction, as indicated by an arrow 50, resistance of the outer shell 48 due to a load will cause the elastomer to shear, in-plane. Since the shear modulus for elastomers is very small, the torque-carrying capability of a spherical or cylindrical radial bearing is very limited.

Figure 4A:
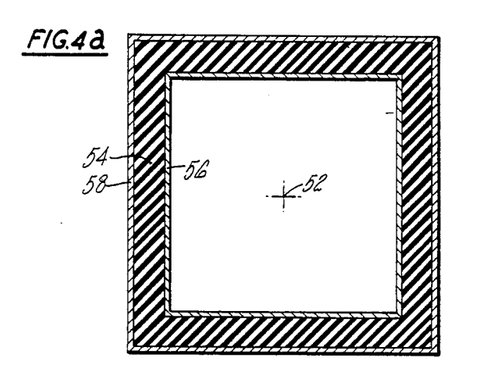
Figure 4B:
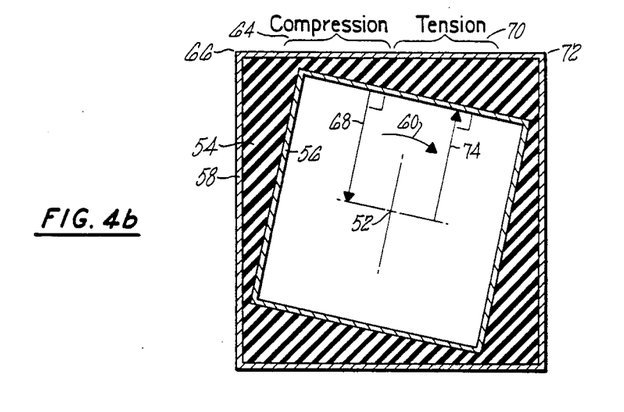

The second model is a bearing having a square transverse cross-section and a center 52, as shown in FIGS. 4a and 4b. A layer of elastomer 54 is disposed between an inner shell 56 and an outer shell 58. FIG. 4a represents the bearing in an unloaded state. When torque is applied to the inner shell 56, about the center 52 in a clockwise direction, as indicated by an arrow 60, and the outer shell 58 resists, the inner shell 56 is displaced slightly in the torquewise direction—i.e., clockwise as shown in FIG. 4b. The applied torque and consequent shift of the inner shell 56 causes the elastomer in a region 64, which is torquewise "after" a corner 66, to be placed in compression. The compressive reactive forces are normal to the surface of the elastomer layer 54, as indicated by a vector 68. Since the reaction vector 68 "misses" the center 52, a moment is generated in a direction counter to the applied torque.

In another region 70, which is torquewise "before" a corner 72, the elastomer is strained in tension. The tensile reactive forces of the elastomer 54 are normal to the surface, as indicated by the vector 74. Since the reaction vector 74 "misses" the center 52, a moment is generated in a direction counter to the applied torque. The reactive forces discussed relative to regions 64 and 70 are typical for the entire perimeter of the bearing and give the bearing torsional stiffness.

The noncircular transverse contour of the bearing, and consequent noncircular transverse cross-section for the elastomer, causes the elastomer to bend (compression and tension normal to the elastomer layer) rather than to shear (in-plane) in response to applied torque. Compression is readily reacted by an elastomer, such as 85% natural rubber and 15% polybutadiene, which has a compressive modulus on the order of hundreds of thousands of pounds per square inch. Tension, on the other hand, is reacted by the tensile strength of the elastomer which is comparatively low, even though in fatigue it is as much as six times the shear modulus. Tension can be reduced to within acceptable limits by bearing precompression, techniques for which are well known in the manufacture of rod end bearings. Elastomer bending rather than shearing, provides the bearing with torsional stiffness so that torque may be transmitted. The mechanics of this model with its one layer of elastomer 54 are applicable to the bearing of FIG. 2 with its several elastomer layers 16.

Returning to FIG. 2, torque is applied to the inner shell 12 about the axis 20 in a clockwise direction, as indicated by the arrow 76, and is resisted by the outer shell 14. The noncircular transverse contour of the bearing causes the elastomer layers 16 to bend. Therefore, in a region 78 that is torquewise "after" a lobe, such as the lobe 34(38), compressive reactive forces are exerted by the elastomer 16 as indicated by the vectors 80–84 according to a distributed hydrostatic pressure pattern under a dashed line 85. Since pressure is normal to the surface, the vectors 80–84 are focused at the origin 26 of the arc segment 30, thereby "missing" the axis 20 and creating a moment counter to the applied torque. Similarly, in a region 86 that is torquewise "before" a lobe, such as the lobe 39, tensile reactive forces are exerted by the elastomer 16 as indicated by the vectors 88–92 according to a distributed hydrostatic pressure pattern under a dashed line 93. Again, since pressure is normal to the surface, the vectors 88–92 are all focused away from the point 26, thereby "missing" the axis 20 and creating a moment counter to the applied torque. At a point 94 on the arc segment 30, which is midway between the lobe 34(38) and the lobe 35(39), there is a transition from compression to tension where the reactive forces of tension and compression are ZERO. The pattern of tension and compression as described with reference to the arc segment 30 is similar for the arc segments 31, 32 and 33. Thus there is a transition from compression to tension at each lobe and midway therebetween where the reactive forces are ZERO. Between the points of ZERO reactive force, the reactive forces increase in a textbook-calculable manner that can be verified by finite element codes, such as TEXGAP or NASTRAN, which adequately represent the behavior of the elastomer. The pressure patterns shown are simply illustrative and it is desirable to design a bearing for gradual gradients within the existing allowables for stiffness, thickness, etc. Although the sum of the reactive forces around the azimuth of the bearing is ZERO, the misfocusing ("missing" the axis 20) of the reactive forces causes a non-ZERO moment which can be calculated by integrating the reactive forces and the distances by which they "miss" the axis 20 over the azimuth of the bearing.

It should be understood that the bearing is not perfectly stiff and that some "winding up" (rotation of the inner shell 12 relative to the outer shell 14 about the axis 20) will occur before equilibrium is reached. Because of "wind-up", the elastomer layers 16 are subject to shear, especially at the arc midpoints (e.g., 94) and at the lobes. However, since "wind-up" is limited, shear is limited and is well within acceptable limits. As mentioned before, with respect to the bearing of FIG. 4, the torsional stiffness of the bearing of FIG. 2 derives from its noncircular transverse contour which causes applied torque to be reacted primarily in compression and tension (normal forces) rather than in shear (in-plane force), and tension is controlled by precompression. In fact, it is desirable that the precompression is of larger magnitude than the reactive tension so that there is net compression.

Figure 5:
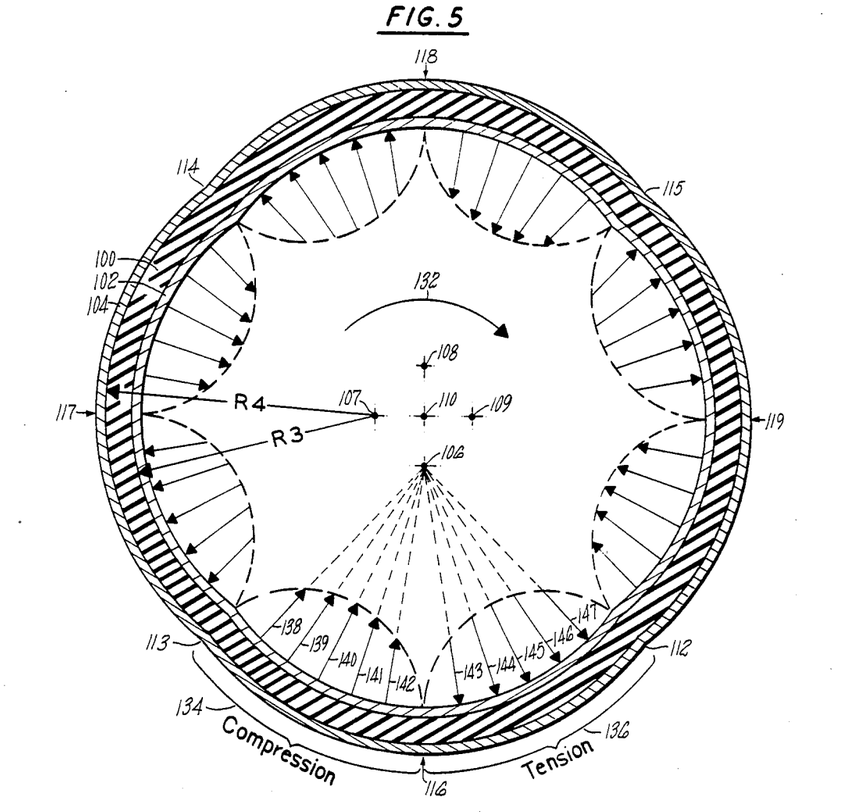
FIG. 5 is a transverse cross-sectional view of an alternate embodiment of the bearing of this invention through its equatorial plane with a hydrostatic pressure pattern superimposed thereon.

As another example of torsional stiffness, consider a bearing having inwardly-extending lobes, a transverse cross-section of which is shown in FIG. 5. For descriptive simplicity, a single elastomer layer 100 is shown disposed between an inner shell 102 and an outer shell 104, although several layers of elastomer separated by nonresilient shims is more typical. The transverse contours of the exterior surface of the inner shell 102 and interior surface of the outer shell 104 are generated by radii (R3) and (R4) from four points 106–109 equally offset from, but symmetrically distributed about the bearing axis 110. The radius (R3) is less than the distance from the inner shell 102 to the axis 110, and the radius (R4) is greater than the radius (R3) by the thickness of the elastomer 100. This results in a transverse cross-section characterized by four inwardly extending lobes 112–115 between which are four arc segments 116–119.

Figure 6A:
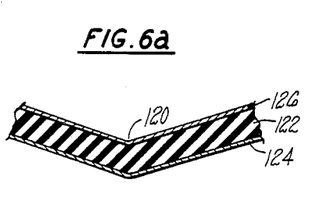
Figure 6B:
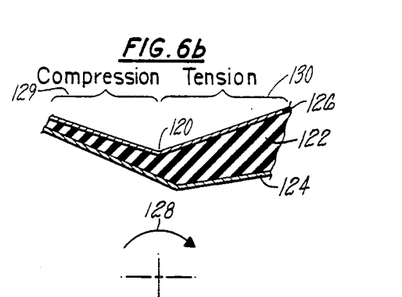

A model is used to visualize the reaction stresses resulting from applied torque. In FIG. 6 is shown a segment of a bearing having a stylized inwardly-extending lobe 120. A layer of elastomer 122 is disposed between an inner shell 124 and an outer shell 126. FIG. 6a represents the bearing in an unloaded state. In response to torque applied in the clockwise direction, as indicated by an arrow 128 in FIG. 6b, the inner shell 124 shifts in the torquewise direction, thereby causing the elastomer to bend so that it is in compression in a region 129 which is torquewise "before" the lobe 120 and in tension in a region 130 which is torquewise "after" the lobe 120.

Applying the concepts of the model (of FIG. 6) to the bearing of FIG. 5, it is observed that torque applied to the inner shell 102 in a clockwise direction, as indicated by an arrow 132, is reacted in compression in a region 134 which is torquewise "before" the lobe 113 and in tension in a region 136 which is torquewise "after" the lobe 112. The reactive forces exerted by the elastomer 100 are ZERO at the lobes and midway therebetween and there is a limited amount of shear all around. The distribution of forces, as described with respect to the area 116 between the lobes 112 and 113, is exemplary of the distribution about the entire azimuth of the bearing. Much as in the example of the outwardly-extending lobe embodiment discussed hereinbefore, the reactive forces of compression and tension exerted by the elastomer 100 are normal to the surface, as indicated by the vectors 138–147, and therefore "miss" the bearing centerpoint 110 so that a moment is generated which is counter to the applied torque. Likewise, precompression acting normal to the surface reduces tension to within functional limits.

It should be understood that the number of lobes is not limited to FOUR, and that any design incorporating the nearly-spherical, axially-lobed concept would be useful for transmitting torque. However, at least three lobes are required to preserve polar symmetry for homokineticity. Furthermore, it should be understood that the arc segment-generated lobes of FIGS. 2 and 5 are not intended as restricting, but rather as illustrative of the teachings of this invention. A bearing have a polygonal transverse cross-section, such as illustrated in FIGS. 4 and 6, would result in "splines" rather than lobes, but as is evident from the discussions relating thereto, would also benefit from the teachings contained herein.

TILTWISE STIFFNESS

Thus far, the description of the invention has focused on the transverse cross-section of the bearing. For maximum torque-carrying capability, the transverse cross-section of the bearing at any position along the longitudinal axis would be constant—resulting, for instance, in a nearly cylindrical, splined or lobed bearing. However, this would be undesirable for a constant velocity joint that must accommodate axial angular misalignment (tilt) between a drive and a load. Consider, for example, the coupling disclosed in U.S. Pat. No. 2,363,469 (Goldschmidt, 1943), entitled FLEXIBLE COUPLING, FLEXIBLE MOUNTING, AND THE LIKE which, as shown in FIG. 4 therein, is essentially a lobed cylindrical bearing. The purpose of that coupling is for the torsional stiffness of the coupling to increase progressively with rotation of one member within another. However, such a configuration is especially noncompliant in tilt. By contrast, it is desirable that the constant velocity joint of this invention be especially compliant in tilt.

Although the bearing of this invention is applicable to rotating loads, tilt is discussed in a "static" sense. As discussed hereinafter, tilt is essentially accommodated in elastomer shear, which is virtually unaffected by tension and compression.

It is known that a true spherical bearing will provide maximum compliance in tilt. However, the lobed transverse cross-section required for torsional stiffness precludes that shape. Nevertheless, it is desirable to "buildup" the bearing axially so that it is as nearly spherical as possible. Generally, this is achieved by reducing the transverse cross-section of the bearing toward its ends according to a spherical function to give the bearing a nearly spherical profile. There are several ways to achieve this result. One way to achieve a nearly spherical profile is to rotate each equatorial arc-segment, such as the arc-segments 30-33 of FIG. 2, about its associated arc-segment generating point, such as the points 26-29 of FIG. 2. This provides an axial contour that has essentially four centers on the equatorial plane.

For a true sphere, the axial contour has only one center. A bearing tilting about that center is very compliant. By contrast, the axial contour of the bearing of this invention has at least two distinct centers, one for each arc-segment and none of which coincide with the bearing center, about which the bearing tilts. (The bearing center can be defined as the intersection of the axis 20 and the equatorial plane.) Therefore, the bearing of this invention is somewhat stiffer than a true sphere.

Another way to achieve the nearly spherical profile is to define cross-sections for each normal plane to the axis, reducing the cross-section according to a spherical function in proportion to the distance between the particular plane and the equatorial plane—or, in other words, reducing the cross-section towards the ends. This is readily achieved by choosing arc-segment generating points for each normal plane that correspond azimuthally to the arc-segment generating points on the equatorial plane, but that are successively closer to the axis, and choosing correspondingly smaller radii to generate the arc-segments. The offset of these points from the axis may even be reduced to ZERO at a truncated end, or edge, rather than at the "virtual" end of the bearing. By generating each transverse cross-section individually, rather than rotating each equatorial arc-segment about its equatorial arc-segment generating point, the centers of axial contour are more vaguely defined and less coincident with the bearing center, thus making the bearing somewhat stiffer in tilt.

In any of the above examples for profiling the bearing so that it is nearly spherical, the torsional stiffness of the bearing is concentrated at the equator—for it is there that the lobes are larger, the amount of elastomer greater, and the moment arm longer—and diminishes toward the ends. Thus the choice of profiling technique may be based on considerations such as a desired ratio of torquewise to tiltwise stiffness, rather than strictly dictated by maximizing or minimizing either, respectively. It should be understood that the profiling techniques discussed herein are applicable to either the inwardly-lobed or outwardly-lobed bearing.

Constant Velocity Joint

Figure 7:
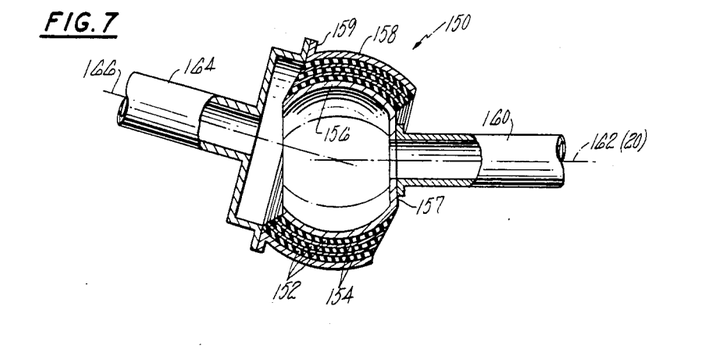
FIG. 7 is a cross-sectional view of a constant velocity joint using the bearing of this invention.

In FIG. 7 is shown a constant velocity joint 150 employing the bearing of this invention, similar to the bearing 10 of FIG. 1. In other words, alternate layers of elastomer 152 and shims 154 are interposed between an inner race 156 and an outer race 158. The inner race 156 has a flange 157 for attachment in a suitable manner to a rotatable drive member 160 which rotates about a drive axis 162 and the outer race 158 has a flange 159 for attachment in a suitable manner to a rotatable load member 164 which rotates about a load axis 166. The drive axis 162 is coincident with a nominal joint axis which would correspond to the bearing axis 20 of the bearing 10. The joint 150 accommodates an angular misalignment between the load axis 166 and the drive axis 162 by elastomer shear. It should be understood that the drive and load are simply illustrative, and may be interchanged.

Tailoring Tiltwise Stiffness

Consider the case of a nearly spherical, lobed bearing, such as is illustrated in FIG. 1. It is readily apparent that the profile will vary somewhat depending upon the azimuth from which the bearing is viewed. In other words, the axial cross-section through a pair of lobes will be slightly greater than through the inter-lobal (arc segment) area. A larger axial cross-section translates into a slightly greater moment and slightly more elastomer resisting tilt. Therefore, the tiltwise stiffness of the bearing at the lobes is slightly greater than therebetween. Another way to analyze the azimuthal variation in tiltwise stiffness is to observe the behavior of the elastomer at ninety degrees to the tilt—where it is essentially twisted. For tilt through an arc segment between lobes, the twist at ninety degrees is reacted in elastomer shear at an arc segment. For tilt through a lobe, the twist at ninety degrees is reacted at another lobe in both shear and bending. As discussed with respect to torque, the elastomer is stiffer in bending than in shear. For certain applications, it is desirable to tailor the tiltwise stiffness of the bearing so that it is uniform for any azimuth.

Figure 8:
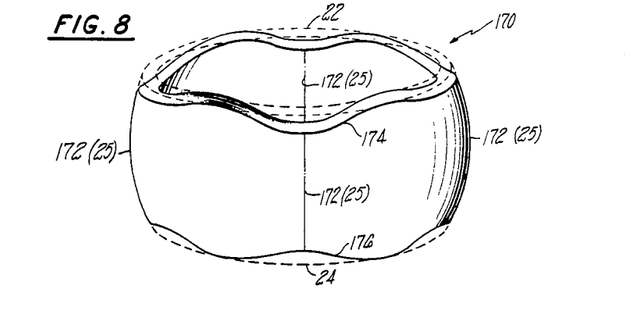
FIG. 8 is an isometric view of the bearing of FIG. 1 incorporating modifications.

According to one scheme for tailoring the tiltwise stiffness of the bearing, the height of the bearing, and consequently its overall axial cross-section, is reduced locally, at azimuths where the tiltwise stiffness otherwise would be greater. This is illustrated in FIG. 8 which shows a bearing 170 having four outwardly-extending lobes 172. The bearing 170 is essentially the same as the bearing 10 of FIG. 1, except that its upper and lower edges 174 and 176 have been contoured so that the height of the bearing varies according to azimuth. The uncontoured ends 22 and 24 of the bearing 10 of FIG. 1 are indicated by dashed lines. At the lobes 172 the height of the bearing is reduced, and it is maximum therebetween. Since the upper and lower edges 174 and 176 contribute little to the torsional stiffness of the bearing 170, the adverse effect of contouring on the torque-carrying ability of the bearing 170 is not profound and, if needs be, can readily be accommodated by overall bearing sizing, as discussed hereinafter. The precise contour required for a constant tiltwise stiffness at all azimuths is textbook calculable and verifiable according to finite element codes as discussed hereinafter. It should be understood that uniform tiltwise stiffness can be achieved by contouring only one of the ends (edges), but that contouring both preserves polar symmetry.

Figure 9:
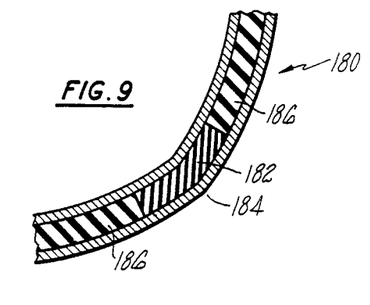
FIG. 9 is a partial transverse cross-sectional view of the bearing of FIG. 2 incorporating modifications.

Another technique for tailoring the tiltwise stiffness of the bearing of this invention is vary the durometer of the elastomer locally, according to azimuth, so that lower durometer (softer) elastomer is used in areas that otherwise (with uniform durometer elastomer) would be stiffer. Consider, in FIG. 9, a partial transverse cross-section of a bearing 180 which is essentially similar to the bearing of FIG. 2. The elastomer 182 at a lobe 184 is softer, and hence more compliant, than the interlobal elastomer 186. Bearing construction techniques are known wherein approximately eighty percent of the elastomer is inserted into the bearing as a solid sheet (calendar), and the remainder is injected as a liquid, thereafter to cure. These techniques are well-adapted for implementing this technique for tailoring tiltwise stiffness. A reduction of durometer at the lobes will impact torsional stiffness as well as tiltwise stiffness. However, FIG. 2 illustrates that the reactive forces of compression and tension, which account for the torsional stiffness of the bearing, are minimum at the lobes. Therefore, the impact upon torsional stiffness of using lesser durometer elastomer at the lobes is minimized and, as in the previous example, can be accounted for by initial bearing sizing considerations.

A variation to the technique of locally varying the durometer of the elastomer is to provide a region of higher durometer (stiffer) elastomer at the ends—in other words, a band around the circumference—and varying the extent, or height, of the band locally to offset bearing stiffness variations. The higher durometer edges would also reduce elastomer bulging.

Figure 10:
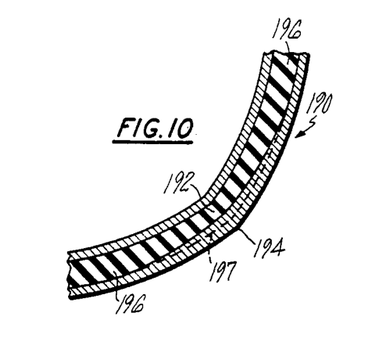
FIG. 10 is a partial transverse cross-sectional view of the bearing of FIG. 2 incorporating modifications.

Yet another technique for tailoring tilt is to vary the thickness of individual elastomer layers locally, at certain azimuths—making the elastomer thinner at azimuths where the bearing otherwise would be stiffer, such as at the lobes. Consider FIG. 10, a partial transverse cross-section of a bearing 190 which is essentially similar to the bearing of FIG. 2. The elastomer 192 at a lobe 194 is thinner, and hence more compliant, than the interlobal elastomer 196. This is indicated by a dashed line 197 that indicates the contour for uniform elastomer thickness. The thickness of a particular elastomer layer is determined by the space between the shims (or, in the case of the outermost elastomer layers, by the space between a shim and the bearing race). Therefore, to reduce the local thickness of an elastomer layer, the local thickness of the adjacent shim(s) is increased. This is readily implemented when composite technology is applied to the manufacture of the shims, as discussed hereinafter. Increasing the shim thickness at a lobe will also have the effect of strengthening the shim locally, which is expedient in light of the pressure gradient at the lobes. Depending upon the application, one or more elastomer layers need to be reduced in thickness locally to make the tiltwise stiffness uniform at all azimuths. It should be understood that varying the thickness of a shim will alter its transverse contour and, hence, the focusing of the reactive forces of tension and compression as discussed with reference to FIG. 2, and will affect torsional stiffness according to that mechanism as well as from reduced layer thickness. However, the lobes per se contribute little to the torsional stiffness of the bearing since the reactive forces of compression and tension are minimum thereat. Nevertheless, these effects may be accounted for in initial sizing considerations.

Gimbal-like Rotor System

Thus far, the description of the invention has focused on the torquewise and tiltwise stiffnesses of the nearly-spherical, lobed bearing of this invention. Those characteristics, in addition to the homokineticity of the bearing, make it useful for certain applications, especially in light of the teachings relative to tailoring tilt, whereby the tiltwise stiffness can be made uniform for all azimuths so as not to introduce vibrations in a rotational load coupled to the bearing.

Consider a helicopter gimbal rotor system wherein a portion of rotor flapping is accommodated by tilting a rotor hub relative to a rotor shaft, rather than through individual, articulated flap hinges for each blade. As discussed previously, a Hooke joint can accommodate both high torque and tilt, but introduces cyclic pulsations in the load which, in the context of a helicopter, would be extremely undesirable not only from a viewpoint of passenger-comfort but, more fundamentally, from a control viewpoint. Therefore, it is known to provide a rotor system with a gimbal bearing, such as a ball joint, to accommodate flapping, and separate means, such as a torque-rigid boot to supply driving torque to the rotor. Examples of these systems are discussed in U.S. Pat. No. 4,323,332 (Fradenburgh, 1982), entitled HINGELESS HELICOPTER ROTOR WITH ELASTIC GIMBAL HUB. By contrast, the nearly-spherical, axially-lobed bearing of this invention offers the possibility for accommodating torque and tilt (flap) in a single compact component, thereby reducing size, parts count, and complexity, while providing the benefits of elastomeric bearings.

Figure 11:
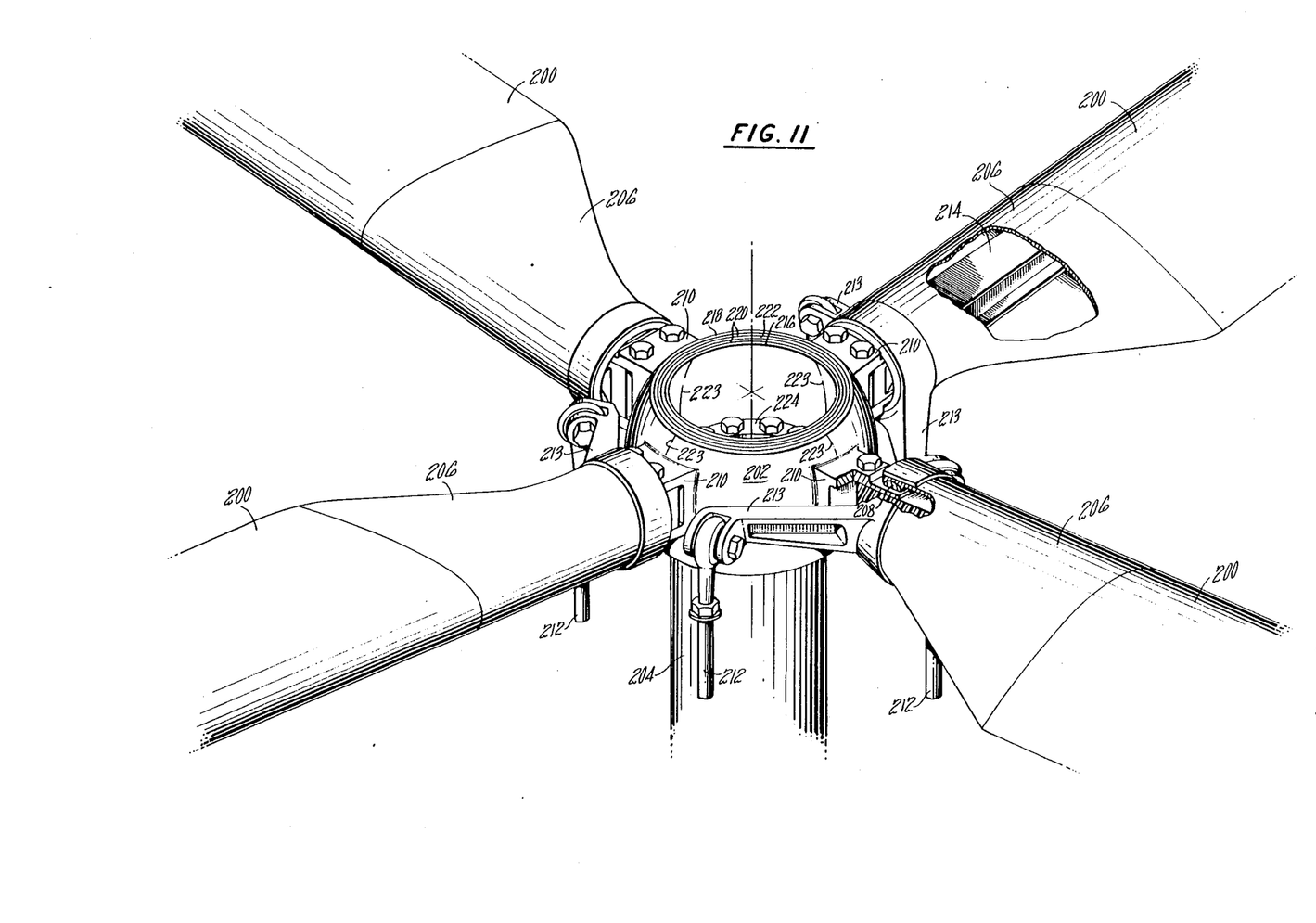
FIG. 11 is a perspective, partial cutaway view of a helicopter gimbal-type rotor system employing the bearing of this invention.

The helicopter rotor system of FIG. 11 comprises four blades 200 attached via a hub 202 to a rotorshaft 204. It should be understood that the number of blades is not limited to FOUR. A blade 200 is attached at its root (inboard) end to a torque tube 206 which is essentially a hollow, torsionally stiff sleeve that is flattened at its blade-attaching (outboard) end to mate with the blade 200. The other (inboard) end of the torque tube 206 is adapted to connect, via a bearing 208, to the hub 202 at a flange 210. The bearing 208 is any suitable bearing, such as a radial elastomeric bearing or a conventional (metallic) spherical bearing (as shown) that allows for rotation of the torque tube 206 about a blade pitch (longitudinal) axis. As will become evident, it is not necessary for the torque tube 206 or the bearing 208 to accommodate blade centrifugal loads.

A control rod 212 is responsive to pilot and/or automatic flight system commands via actuators and a swash plate (neither are shown). The rod 212 is connected via a pitch link (horn) 213 to the inboard end of the torque tube 206 so that linear rod motion is translated into rotary blade pitch changing motion which is imparted, via the torque tube 206, to the blade 200.

A longitudinal spar 214 is attached at its inboard end to the hub 202 at the flange 210. At its other (outboard) end the spar 214 is attached in a suitable manner to the blade 200, at or near the point where the blade 200 is joined to the torque tube 206. The materials and configuration for the spar 214 are selected to be torsionally compliant so as to accommodate blade pitch changes, and to be relatively stiff when bending in response to blade flapping and even stiffer in response to lead/lag motions. The spar 214 may comprise an I-beam formed of composite materials which complies with these design paramaters. Blade centrifugal forces are reacted along the length of the spar 214 rather than in the torque tube 206.

As mentioned hereinbefore, it is a fundamental principle of gimbal rotor systems that the hub accommodates at least a portion of the overall rotor flapping. Therefore, the hub 202 is pivotally attached for flapping to the rotor shaft 204, in the following manner, making the rotor system of this invention a "gimbal-like" rotor.

The hub 202 is essentially a bearing (joint) that is similar to the bearing 10 of FIG. 1. In other words, the hub 202 comprises an inner shell 216 (compare 12), an outer shell 218 (compare 14), and alternate layers of elastomer 220 (compare 16) and non-resilient shims 222 (compare 18) interposed at increasing radii therebetween. The number of layers is not limited to the number shown.

The torque handling ability of the hub 202 derives from longitudinal lobes 223 that affect the transverse cross-section of the elastomer layers, which has been discussed in detail hereinbefore. The main difference between the hub 202 and the bearing 10 (of FIG. 1) is in the exterior (facing away from the elastomer) faces of the shells (races). It should be understood that the outer shell 218 distributes the driving torque to all blades 200 essentially equally, regardless of whether the lobes are located at the blades or inbetween. It is not even necessary that the number of blades equal the number of lobes, or vice-versa.

The exterior surface of the inner shell 216 is provided with a flange, such as a flat annular flange 224, that is suited for attachment, such as by bolting, to a mating surface on the rotorshaft 204 to receive driving torque therefrom. The inner shell 216 is coaxial with the rotor shaft 204.

The exterior surface of the outer shell 218 is provided with the flanges 210 for attachment of the spar 214 and the torque tube 206. Since blade centrifugal forces for all four blades 206 are transmitted along the respective spars 214, the blade centrifugal forces are reacted entirely by the outer shell 218. Therefore, the outer shell 218 must be sized accordingly, especially in thickness. In the case of a composite (nonmetallic) outer race 218, fiber orientation can be used advantageously.

Thus, in the rotor system, torque and flapping are accommodated by a single bearing (joint). Lead/lag motions are accommodated (damped) by bearing windup, as discussed hereinbefore. It should be understood that flapping is shared between the hub 202 and the spar 214—for instance, 70% and 30% respectively. The rotor system shown and described is simply illustrative of an application for the joint of this invention and many other rotor configurations would benefit from the use of the joint. "Flap" in the context of a rotor system is the equivalent of "tilt" as discussed hereinbefore.

Insofar as particular lobe geometries are concerned, either inwardly or outwardly extending lobes are well suited to the use of the bearing of this invention in a helicopter gimbal-like rotor system. Design particulars will depend largely upon individual applications. For instance, the ratio of torquewise stiffness to tiltwise stiffness can be established, as well as edgewise natural frequencies.

Accommodating Axial Load

The previous discussions regarding torsional stiffness, tiltwise stiffness, homokineticity, and centrifugal loads are all very relevant to the incorporation of the bearing of this invention in a helicopter gimbal-like rotor system. However, unlike many other systems involving the coupling of a drive to a load, in a rotor system there is an additional requirement that the bearing be able to accommodate an axial load such as the lift generated by the rotor.

Generally, the load-carrying ability of an elastomeric bearing is related to the cross-section and orientation of the elastomer layers relative to the load. For instance, a rod end bearing, which is essentially a spherical bearing truncated at two opposite ends, is subjected to radial loads that are reacted in elastomer compression on one side of the bearing and in elastomer tension on the opposite side. As discussed hereinbefore, elastomer tension is reduced by precompression. By contrast, in the case of the bearing of this invention, the end where an axial load could most effectively be reacted (i.e., in elastomer compression) is truncated. One approach to reacting an axial load would be to not truncate the bearing on the end in compression—leaving only the opposite end (in tension) truncated to accommodate attachment to the inner race (shell). In the rotor system of FIG. 11, this would mean not truncating the rotorshaft-end of the bearing, but that is clearly not possible.

A first order solution to the problem of accommodating axial load is to truncate as little as possible on the end of the bearing that would otherwise react an axial load in elastomer compression. However, there is an inherent limit to this approach imposed by the size of the drive and the range of tilt.

In the case where both ends of the bearing are truncated, there is no elastomer where it would be most useful. An ancillary problem to the diminished ability of such a bearing to accommodate an axial load is that the load will cause an axial distortion of the bearing—in other words, successive layers will be increasingly displaced (offset) axially in response to the axial load—and a consequent stiffening of the bearing in tilt. It should be understood that axial loads can be in one of two opposite directions, either tending to push together or to pull apart the drive and load members. The latter, which exert a separating force, are discussed, but the teachings are equally applicable, in an opposite sense, to the former.

Figure 12:
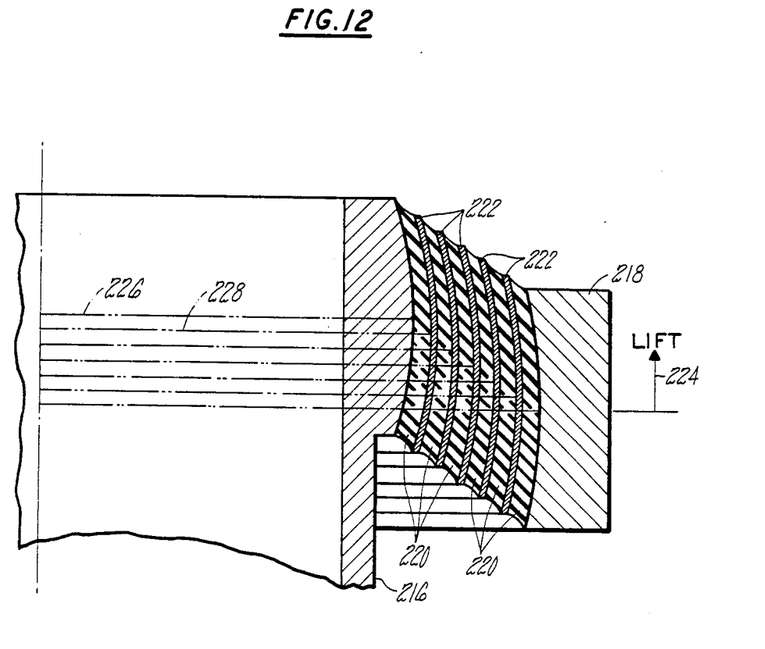
FIG. 12 is an axial (vertical) section of the bearing shown in FIG. 11.

In FIG. 12 is shown a partial axial cross-section of a bearing which accommodates a separating axial load without stiffening in tilt. The bearing is comparable to the hub bearing in the gimbal-like rotor system of FIG. 11 except that FIG. 11 does not disclose the following feature, and six elastomer layers are shown, rather than only two. The separating axial load is the equivalent of rotor lift and is indicated by a force applied to the outer race 218, in the upward direction as indicated by an arrow 224, that is resisted by the inner race 216.

Without the feature, the centers of axial contour for each elastomer layer would be coplanar—on the equatorial plane—for maximum tiltwise compliance.

With the feature, the bearing is manufactured with each successive layer 220 of elastomer, and hence each successive shim 222, offset increasingly away from the load at increasing radii. In other words, the most inward elastomer layer has its centers of axial contour disposed on the equatorial plane 226. The next outward elastomer layer is of increased radius, as discussed hereinbefore, and has its centers of axial contour disposed on a plane 228 which is offset from the reference plane in a direction away from the applied, separating axial load. Each succeeding elastomer layer is disposed so that its centers of axial contour are on a plane which is offset from the reference plane in a direction away from the applied, separating axial load. One result of this configuration is that the elastomer is thicker at the end of the bearing which is away from the load and reacts the load in compression.

When separating axial load (LIFT) is applied to the bearing, the outer race 218, and each successive elastomer layer yield in the direction of the load, thereby bringing together the centers of axial contour. Ideally, the offset is perfectly matched to the load so that the centers of axial contour all coincide on the equatorial plane 226 under load, and tiltwise stiffness is thereby minimized. However, with varying loads, such as are inherent in a helicopter rotor certain design compromises may be necessary. But these are all accommodated in the initial sizing of the bearing.

Since the centers of axial contour coincide less without an axial load, the bearing is stiffer without a load and softer with a load. This is ideal for a helicopter. For instance, when the helicopter is parked or taxiing, the rotor is stiff in tilt so that wind gusts do not cause excessive tilt angles. For in-flight maneuvering, the rotor is more compliant in flap.

The essential characteristic of this feature is that the elastomer layers are progressively offset axially in a direction away from an anticipated axial load so that the load causes the layers to be less offset. The offset causes more elastomer to be placed in compression to accommodate the load. It should be understood that this feature is independent of the lobes—in other words, the feature would be useful in the context of a spherical bearing that does not have axial lobes and which, consequently could not handle high torque loads.

It should be understood that the basic invention relates to a nearly spherical lobed bearing that accommodates torque and tilt and that acts as a constant velocity joint. The function of the bearing is improved for certain applications by making the tiltwise stiffners uniform at all azimuths and enhancing the axial load carrying capability of the bearing. For instance, the improvements are useful, but not absolutely essential, in the context of applying the bearing, or joint, to a gimbal-like rotor system. There are many applications for the basic bearing, sans the improvements.

MANUFACTURING TECHNIQUES

As mentioned hereinbefore, several alternating layers of elastomer and non-resilient shims are disposed between the races. Generally, these materials and the methods by which they are assembled together with the races are well known. For instance, rubber compounds are well suited for the elastomer and they may be injected at high pressures into the bearing during manufacture to effect precompression. It is also known to vary durometer from layer-to-layer to maximize fatigue life. It is evident that for certain bearing geometries, it will be necessary to split the shims during manufacture so that they may be inserted into the bearing. Splitting the shims and staggering the gaps are well known—for instance, in the art of rod end bearings. Also, the shims must be thick enough to maintain their dimensions during high compression molding.

In the general case, the shims will be of uniform thickness and their shape will correspond to the contour of the races. However, in applications where it is desirable to reduce the elastomer thickness in an area, it is desirable to vary the shim thickness. In these cases, a composite layup, such as graphite/epoxy, is well suited for the shim, especially in conjunction with computerized design and manufacture facilities.

It should be understood that the shims are exposed to the reactive forces of tension and compression (i.e., bending—as discussed hereinbefore). Bending moments create high hoop stresses and are of concern in shim design. For instance, in U.S. Pat. No. 4,142,833 (Rybicki, 1979), entitled ELASTOMERIC BEARING FOR HELICOPTER ROTOR, the laminate geometry is designed to reduce laminate bending. By contrast, the geometry of the bearing of this invention is specifically intended to cause laminate bending. This simply means that the shims must be designed accordingly.

"In the initial sizing of bearings for design trade-off studies, the analytical techniques involve simple methods based upon conventional strength of material approaches. Average pressures and strains are calculated using handbook formulas and average elastomer criteria for shape factor and modulus. Empirical formulas, based on gross assumptions of bearing construction, are available to establish initial overall size. Bearing stiffness can be calculated, using handbook techniques, to determine compatibility with the specific application. After the bearing's external envelope is defined in this manner, specific details of the laminate package can then be defined. Shim thickness and elastomer laminate thickness and modulus can be selected on the basis of balanced elastomer strains and/or stiffness, and by shim bending stresses. Simplified geometry and idealized loading assumptions are required at this stage of the analysis for purposes of design iteration. Bearing loads and/or motions must be applied individually and added vectorially or stresses must be superposed to establish a basic understanding of the combined (shim) or elastomer stresses.

"This methodology does not account for the nonlinear stress-strain behavior of the elastomer, nor for the non-linearities involved in the analysis of any large strain problem. In addition, many bearings under load have non-axisymmetric geometries and non-axisymmetric loadings. Finite element techniques are required to obtain a better understanding of this three-dimensional highly non-linear analytic problem. Computer codes have been developed, based on programs like TEX-GAP (and NASTRAN) which are capable of handling some of the problems involved in this analysis. They contain elements which are formulated to reflect the incompressible behavior of elastomers (Poisson's ratios near 0.5). The entire bearing can also be modeled. A more accurate definition of the stress/strain within the bearing can be obtained under various combinations of loading. Local and edge effects can be more accurately evaluated. The bearing design can be refined to obtain a better balance of elastomer strains across the bearing and to minimize shim stresses." (American Helicopter Society Journal, January 1981, p. 37: The Sikorsky Elastomeric Rotor, R. Rybicki)

Although the invention has been shown and described with regard to particular embodiments, it should be understood that various changes and additions could be made therein and thereto without departing from the spirit and scope of the invention.

What is claimed is:

1. A constant velocity joint comprising:

an inner shell having an exterior surface defined by an axis at least three arc segments generating points equally offset from the axis and symmetrically distributed thereabout on a plane which is normal to the axis, and a first radius from each of the at least three arc segment generating points, said exterior surface having a nearly spherical axial profile with polar symmetry;

an outer shell disposed about the inner shell and having an interior surface defined by the axis, the at least three arc segment generating points, and a second radius larger than the first radius from each of the at least three arc segment generating points, said interior surface having a nearly spherical axial profile with polar symmetry; and at least one elastomeric layer disposed between the exterior surface of the inner shell and the interior surface of the outer shell, the axial height of the at least one elastomer layer varying according to the tiltwise stiffness of the constant velocity joint at various azimuths so that the tiltwise stiffness of the constant velocity joint is uniform at all azimuths.

2. A constant velocity joint comprising:

an inner shell having an exterior surface defined by an axis at least three arc segments generating points equally offset from the axis and symmetrically distrubuted thereabout on a plane which is normal to the axis, and a first radius from each of the at least three arc segment generating points, said exterior surface having a nearly spherical axial profile with polar symmetry;

an outer shell disposed about the inner shell and having an interior surface defined by the axis, the at least three arc segment generating opints, and a second radius larger than the first radius from each of the at least three arc segment generating points, said interior surface having a nearly spherical axial profile with polar symmetry; and at least one elastomer layer disposed between the exterior surface of the inner shell and the interior surface of the outer shell, the axial height of the at least one elastomer layer varying according to the tiltwise stiffness of the constant velocity joint at various azimuths, the thickness of the at least one elastomer layer varying according to the tiltwise stiffness of the constant velocity joint at various azimuths, and the durometer of the at least one elastomer layer varying according to the tiltwise stiffness of the constant velocity joint at various azimuths so that the tiltwise stiffness of the constant velocity joint is unifrom at all azimuths.

* * * * *